United States Patent
Zhang

(10) Patent No.: US 8,411,862 B2
(45) Date of Patent: Apr. 2, 2013

(54) TIMING ADJUSTMENT FOR SESSION SECURITY PROTOCOL

(75) Inventor: Bulin Zhang, Branchburg, NJ (US)

(73) Assignee: Alcatel Lucent, Paris (FR)

( * ) Notice: Subject to any disclaimer, the term of this patent is extended or adjusted under 35 U.S.C. 154(b) by 1107 days.

(21) Appl. No.: 12/357,489

(22) Filed: Jan. 22, 2009

(65) Prior Publication Data

US 2009/0268913 A1 Oct. 29, 2009

Related U.S. Application Data

(60) Provisional application No. 61/125,447, filed on Apr. 25, 2008.

(51) Int. Cl.
*H04L 9/12* (2006.01)
(52) U.S. Cl. .......................... 380/274; 713/181
(58) Field of Classification Search .................. None
See application file for complete search history.

(56) References Cited

U.S. PATENT DOCUMENTS

| | | | | |
|---|---|---|---|---|
| 6,230,013 B1 * | 5/2001 | Wallentin et al. | ............. | 455/436 |
| 6,373,834 B1 * | 4/2002 | Lundh et al. | .................. | 370/350 |
| 2003/0206538 A1 * | 11/2003 | Rezaiifar et al. | ............. | 370/335 |
| 2007/0101120 A1 * | 5/2007 | Patel et al. | ..................... | 713/151 |
| 2007/0189538 A1 * | 8/2007 | Lindteigen | .................... | 380/274 |

* cited by examiner

*Primary Examiner* — Gilberto Barron, Jr.
*Assistant Examiner* — Shaun Gregory
(74) *Attorney, Agent, or Firm* — Mendelsohn, Drucker & Associates, P.C.; Edward Meisarosh; Steve Mendelsohn

(57) ABSTRACT

According to certain embodiments of the present invention, cryptosynchronization values are calculated on an initiating and/or responding device in a communications system such that cryptosynchronization-based procedures might succeed even when the discrepancy between the system times of the initiating and responding devices exceeds the cryptosync constraints imposed by the communications system. In one embodiment, the initiating device add/subtracts a cryptosynchronization adjustment value x to/from the initiating device's system time to yield an adjusted initiator cryptosynchronization value. In another embodiment, the receiving device adjusts the receiving device's system time to yield an adjusted receiver cryptosynchronization value.

18 Claims, 7 Drawing Sheets

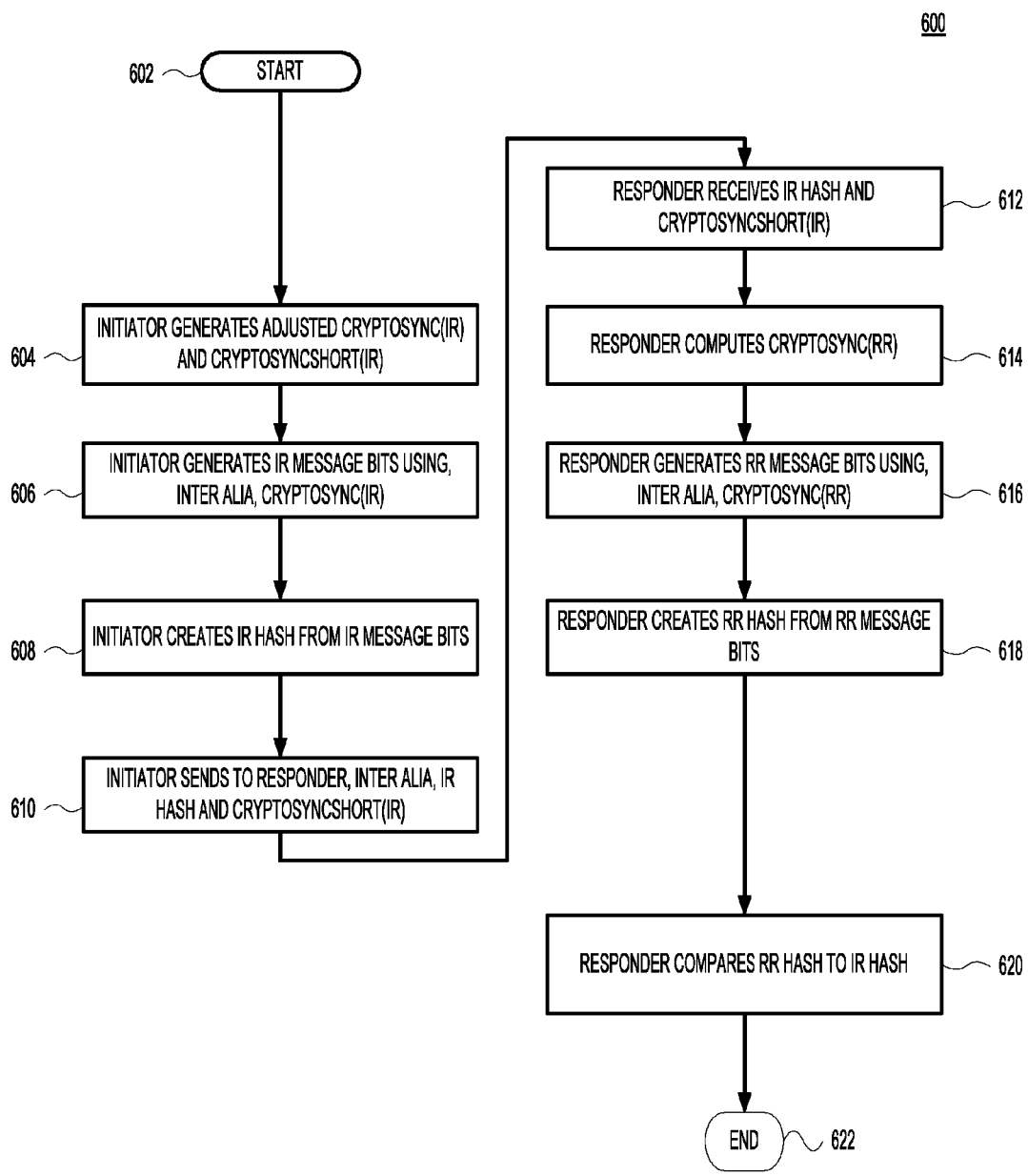

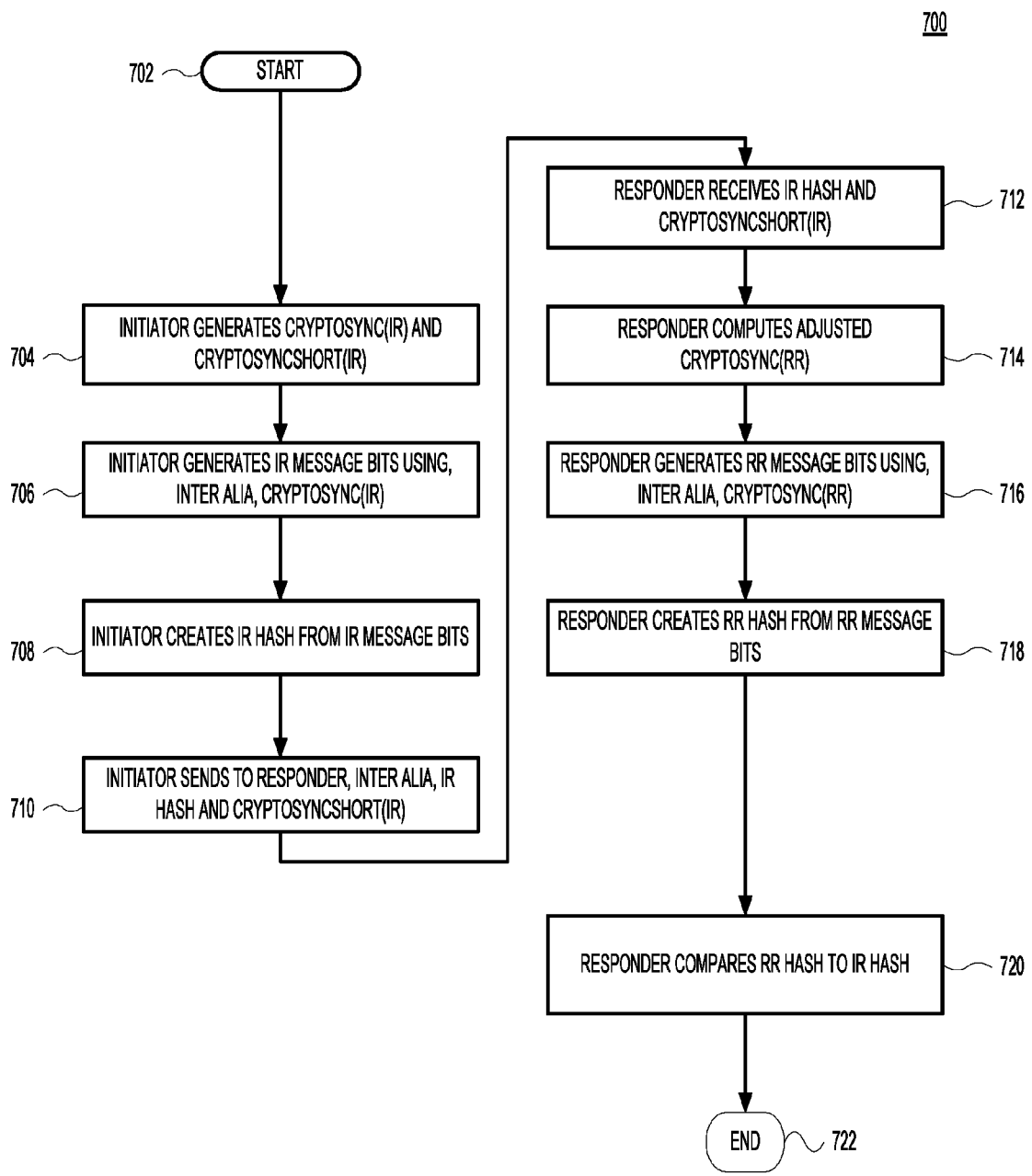

TIMING ADJUSTMENT FOR SESSION SECURITY PROTOCOL

CROSS-REFERENCE TO RELATED APPLICATIONS

This application claims the benefit of the filing date of U.S. provisional application No. 61/125,447, filed on Apr. 25, 2008 as the teachings of which are incorporated herein by reference in their entirety.

BACKGROUND OF THE INVENTION

1. Field of the Invention

This invention relates generally to the field of communication systems and, more particularly, to session security protocol for a wireless communication system.

2. Description of the Related Art

Evolution-Data Optimized (EVDO) is a telecommunications standard for the wireless transmission of data through radio signals, typically for broadband Internet access. The EVDO protocol is a member of the CDMA2000 family of standards. The CDMA2000 family of standards are defined in "CDMA2000 High Rate Packet Data Air Interface Specification," 3GPP2 C.S0024-B, Version 2.0, March 2007 (referred to herein as "3GGP2 C.S0024-B v2.0"), the teachings of which are incorporated herein by reference in their entirety.

FIG. 1 is a block diagram of a portion of a typical CDMA network 100. Access network 102 controls one or more base transceiver stations (BTSs) 104. Access terminal 106 communicates wirelessly with BTSs 104.

Access network 102, BTSs 104, and access terminal 106 utilize a time value known as the CDMA system time. Typically, BTS 104 and access network 102 use the time from the global positioning system (GPS) to generate their CDMA system time. Access terminal 106 typically gets its CDMA system time value from BTS 104 via an over-the-air broadcast message.

Communications between access network 102 and access terminal 106 is organized into several channels, e.g., traffic channel, access channel. The traffic channel carries rate-paying data, e.g., a communication between the access terminal and another access terminal. The access channel is used for communications between access terminal 106 and access network 102 when a traffic channel is not in use. The access channel is used primarily for call setup, i.e., authentication of the terminal and assignment of a traffic channel.

Communications over a channel are in the form of packets. A packet typically comprises a header, a payload, and a trailer. Packets are processed as they travel from source to destination, e.g., encapsulated/de-encapsulated. The CDMA2000 family of standards defines the processing of packets using a seven-layer model.

FIG. 2 is a diagram of the seven-layer model 200 used in CDMA2000. When a packet is sent by a source, the packet starts at application layer 214, and is processed by stream layer 212, session layer 210, connection layer 208, security layer 206, medium access control (MAC) layer 204, and physical layer 202. When a packet is received by a destination, the packet traverses the same seven layers, beginning with physical layer 202, and ending with application layer 214.

Security layer 206 performs several security-related functions, including the encryption and decryption of packets, and the authentication of packets. Security layer 206 utilizes four protocols: (i) the key-exchange protocol, (ii) the authentication protocol, (iii) the encryption protocol, and (iv) the security protocol. Three of the four security-layer protocols are important to this discussion: the security, key-exchange, and authentication protocols.

Generic Security Protocol

Two security-protocol variants are specified in 3GGP2 C.S0024-B v2.0: the default security protocol (section 8.3) and the generic security protocol (section 8.4). The default security protocol does not provide any services, but merely transfers packets between the authentication protocol and the MAC layer.

The generic security protocol's function is to generate crypto-synchronization (cryptosync) values for use by the other security-layer protocols. When a packet is being processed for transmission, the generic security protocol calculates cryptosync values based on the current CDMA system time. When a received packet is being processed, the generic security protocol calculates cryptosync values based on (i) the current CDMA system time and (ii) the information provided in the generic security protocol header of the received packet.

A cryptosync is a changing, common, external factor to an encryption process that causes the ciphertext for a particular plaintext to change with time. A common encryption process is the SHA-1 Secure Hash Algorithm, defined in Federal Information Processing document FIPS 180, the teachings of which are hereby incorporated by reference in their entirety. SHA-1 is a one-way function that takes a given plaintext and computes a 160-bit, nearly-unique ciphertext, i.e., hash, of that plaintext, where it is computationally impractical to derive the plaintext from its hash.

One typical use of SHA-1 is authentication. For example, assume that nodes A and B share a unique, secret key. If node A wants to prove to node B that it is in fact node A without broadcasting the plaintext of its secret key, node A can create an SHA-1 hash of its copy of the secret key and send it to node B. Node A is the initiator. Node B then creates an SHA-1 hash of its copy of the unique key, and compares the two hashes. Node B is the responder. If the hashes match, then the initiator, i.e., node A, is authenticated.

SHA-1 will always generate the same hash for the same specific plaintext. Therefore, if node C intercepts the hash sent from node A to node B, node C can use that hash to masquerade as node A to node B. This is known as a replay attack. To prevent replay attacks, a cryptosync is typically included in the plaintext. For example, node A and node B have synchronized clocks which increment every second. Node A concatenates its copy of the secret key with the clock time (the cryptosync) to yield a plaintext. Thus, the plaintext changes every second, and, consequently, the computed SHA-1 hash of that plaintext will change every second.

Node A sends its computed SHA-1 hash to node B. Node B concatenates its copy of the secret key with its clock time to create a plaintext, and compares the hash of that plaintext to the hash it received. If the hashes match, then the sender is authenticated as node A. Node C has at most a second in which to intercept node A's sent hash and pass itself off as node A. Otherwise, node B's clock will increment, and the hashes will not match.

A system that uses clock cryptosyncs, e.g., CDMA2000, typically makes allowance for a specified discrepancy between initiator and responder cryptosyncs. The specified discrepancy typically takes into account (i) the maximum computation and transmission delay and (ii) the maximum synchronization error.

Computation and transmission delay CTDelay is the absolute-time duration between (i) when the initiator computes its cryptosync and (ii) when the responder computes its cryptosync. CTDelay includes all the time required to, e.g., calculate the hash, further process the packet for transmission, transmit the packet, process the received packet for delivery to the security layer, etc.

Synchronization error is the discrepancy between the sender's clock and the receiver's clock. Thus, if a system has a maximum possible CTDelay of two seconds, and a maximum possible synchronization error of one second, then allowance is typically made for the cryptosyncs to differ by at least three seconds and still be considered equal.

In order to make this allowance, the CDMA generic security protocol calculates two cryptosync values: Cryptosync and CryptosyncShort. Cryptosync is the 64-bit CDMA system time of the device computing Cryptosync, in units of 80 ms. CryptosynchShort is the 16 least-significant digits of Cryptosync. As is discussed in greater detail below, the CDMA system uses these two values to calculate the responder's Cryptosync, i.e., Cryptosync(RR), such that Cryptosync(RR) will be equal to the initiator's Cryptosync, i.e., Cryptosync(IR), as long as Cryptosync(IR) is (i) no greater (later) than the system time of the receiver at the moment of Cryptosync(RR) calculation, and (ii) no more than 1.45 hours less (earlier) than the system time of the receiver at the moment of Cryptosync(RR) calculation.

SHA-1 Authentication Protocol

The authentication protocol comprises two variants: the default authentication protocol and the SHA-1 authentication protocol. The default authentication protocol is a null protocol, providing no services and simply relaying, unaltered, any packets which it receives.

The SHA-1 authentication protocol (3GPP2 C.S0024-B v2.0, section 8.8) defines a procedure (the access-channel authentication procedure) for authenticating an access-channel, MAC-layer packet by creating a message digest (i.e., an SHA-1 hash) of the data within the packet, and sending the message digest along with the packet data.

The SHA-1 authentication protocol is initiated by the access terminal, and thus the access terminal is referred to as the initiator, abbreviated IR. Likewise, the access network is referred to as the responder, abbreviated RR.

FIG. 3 is a flowchart of conventional access-channel authentication procedure 300. Processing begins at step 302 and continues to step 304 where the access terminal generates two values: Cryptosync(IR) and CryptosyncShort(IR). Specifically, procedure 300 gets these values from the generic security protocol. The generic security protocol generates these two values according to the following Equations (1) and (2):

$$Cryptosync(IR) = SystemTime(IR) \qquad (1)$$

$$CryptosyncShort(IR) = Cryptosync(IR)[15:0] \qquad (2)$$

where SystemTime(IR) is the 64-bit CDMA system time of the access terminal.

Next, at step 306, the access terminal creates a plaintext, i.e., the IR message bits, from several inputs, including (i) a secret session key SKey shared by the access terminal and access network, and (ii) Cryptosync(IR).

Next, at step 308, the access terminal creates a 160-bit SHA-1 hash from the IR message bits, and stores the 64 least-significant bits of the hash as the IR hash.

Next, at step 310, a packet is sent to the access network containing, inter alia, (i) the 64-bit IR hash (i.e., the access-channel packet-authentication code (ACPAC)) and (ii) CryptosynchShort(IR).

Next, at step 312, the access network receives the packet send by the access terminal, and extracts the IR hash and CryptosynchShort(IR).

Next, at step 314, procedure 300 asks the generic security protocol to generate Cryptosync(RR), which the generic security protocol does according to the following Equation (3):

$$Cryptosync(RR) = \left( \begin{array}{c} SystemTime(RR) - \\ ((SystemTime(RR)[15:0] - CryptosyncShort(IR)) \bmod 2^{16}) \end{array} \right) \bmod 2^{64} \qquad (3)$$

where SystemTime(RR) is the 64-bit CDMA system time of the access network.

The net effect of Equation (3) is that Cryptosync(RR) will be set equal to Cryptosync(IR) as long as Cryptosync(IR) is (i) no greater than SystemTime(RR) and (ii) no more than $2^{16}$ (or 65,536) less than SystemTime(RR). Stated another way, Equation (3) will set the Cryptosync(RR) equal to Cryptosync(IR) as long as Cryptosync(IR) is (i) no later than SystemTime(RR) and (ii) no earlier than SystemTime(RR) less 65,536×80 ms, or 1.45 hours. If either of these conditions is violated, then procedure 300 will fail. These two conditions are called the cryptosync constraints.

Next, at step 316, the access network creates a plaintext, i.e., the RR message bits, from several inputs, including (i) a secret session key SKey shared by the access terminal and access network and (ii) Cryptosync(RR).

Next, at step 318, the access network creates a 160-bit SHA-1 hash from the RR message bits, and sets the RR hash equal to the 64 least-significant bits of the calculated SHA-1 hash.

Next, at step 320, the access network compares the IR hash to the RR hash. If the two hashes match, then procedure 300 results in success (i.e., the access-channel packet is authenticated and the payload of the access-channel packet is forwarded to the encryption protocol); otherwise, procedure 300 results in failure (i.e., the access-channel packet is not authenticated and is dropped).

DH Key-Exchange Procedure

There exist two variants of the key-exchange protocol: a default key-exchange protocol and a Diffie-Hellman (DH) key-exchange protocol. The default key-exchange protocol is null, i.e., it performs no services.

The DH key-exchange protocol, defined in section 8.6 of 3GPP2 C.S0024-B v2.0, specifies a procedure, i.e., the DH key-exchange procedure, whereby the access network and the access terminal calculate a shared, secret key SKey that will be used for subsequent authentication and encryption. The key-exchange procedure is typically performed when the access terminal wishes to establish a new session with the access network, e.g., after the access terminal is turned on.

The DH key-exchange procedure comprises two sequential sub-procedures. In the first sub-procedure, the access terminal and the access network each calculate SKey. Specifically, the access terminal and the access network each calculate an ephemeral public key and send the ephemeral public key to the other. Then, access terminal and access network each calculate a value for SKey based in part on the ephemeral public key received from the other. The access terminal and the access network should both arrive at the same value for SKey.

The second sub-procedure of the DH key-exchange procedure is to verify that, in fact, the access terminal and the access network have calculated the same value for SKey. This second sub-procedure, with several minor differences, is the same process as process 300 of FIG. 3. One difference is that the access network is now the initiator, and the access terminal is the responder. Furthermore, some of the inputs used to create the IR and RR message bits in steps 306 and 316 are different, and the IR and RR hashes generated in steps 308 and 318 are the entire 160-bit SHA-1 hashes, and not the 64 least-significant bits of the SHA-1 hashes. Yet further, the DH key-exchange protocol does not refer to the cryptosync values as Cryptosync and CryptosynchShort, but, instead, as TimeStampLong and TimeStampShort. Lastly, the DH key-exchange procedure does not rely on the generic security protocol to calculate TimeStampLong(IR), TimeStampShort(IR), TimeStampLong(RR), and TimeStampShort(RR), but, instead, calculates those values itself. (From this point forward, the term Cryptosync will refer to both Cryptosync and TimeStampLong, and the term CryptosynchShort will refer to both CryptosynchShort and TimeStampShort.)

Despite these differences, the same equations used by the generic security protocol to calculate the four cryptosync values, e.g., Equations (1), (2), and (3), above, can be used by the DH key-exchange protocol.

When used in the access-channel authentication procedure, Equation (3) requires that the CDMA system time of the access terminal at the moment of cryptosync calculation be less (earlier) than the CDMA system time of the access network at the moment of cryptosync calculation. When used in the DH key-exchange procedure, Equation (3) requires the opposite, i.e., that the access network time be earlier than the access terminal time. Together, these equations would appear to require absolute synchronization between access terminal and access network. Otherwise, one or both of the procedures will fail.

However, the processing and transmission that takes place between those two calculations introduces a measurable delay called the computation and transmission delay CTDelay.

Furthermore, as discussed above, CDMA assumes that the CDMA system times of the access network and BTSs in a typical network are synchronized using the global positioning system (GPS), and that the access terminal is getting its CDMA system time from the BTS. As a result, CDMA system time is tightly synchronized throughout a GPS-enabled CDMA system—so tightly synchronized, in fact, that any discrepancy between the CDMA system times of the access network, BTS, and access terminal is far smaller than CTDelay. Thus, in such GPS-enabled systems, meeting the combined constraints of the two procedures is not a concern.

Another consequence of the assumption of GPS synchronization is that BTS units typically are designed to get their system time from GPS, and not from the access network. However, it sometimes occurs that a BTS temporarily loses GPS signal. It also sometimes occurs that some BTSs never have access to GPS signals, e.g., when a BTS is deployed in a tunnel or subway. In these situations, it is typical for the CDMA system time of the BTS to diverge from the CDMA system time of the access network. Since the access terminal gets its CDMA system time from the BTS, if the BTS is out of sync with the access network, the access terminal will also be out of sync with the access network.

If the difference between the access terminal and access network system times is greater than CTDelay, then either or both of the DH key-exchange procedure or the access-channel authentication procedure will fail. Depending on how the system is configured, those failures may result in access terminal users being unable to access the system.

One possible solution to this dilemma is to modify BTS units so that they get their system time from the access network. However, this can be a costly hardware and software modification.

SUMMARY OF THE INVENTION

In one embodiment, the invention is a first node for a communication system comprising the first node and a second node. In a first communication procedure, the first node derives a first cryptosynchronization value (e.g., TimeStampLong(IR)) and a second cryptosynchronization value (e.g., TimeStampShort(IR)) based on first node system time (e.g., SystemTime(IR)) and a cryptosynchronization adjustment value (e.g., x). The first node generates an initiator message digest based on the first cryptosynchronization value. The first node transmits the initiator message digest and the second cryptosynchronization value to the second node. The second node generates a third cryptosynchronization value (e.g., TimeStampLong(RR)) based on (i) the second cryptosynchronization value received from the first node and (ii) second node system time (e.g., SystemTime(RR)). The second node generates a responder message digest based on the third cryptosynchronization value. The second node compares (i) the initiator message digest received from the first node and (ii) the responder message digest to determine whether the first communication procedure fails.

In another embodiment, the invention is a first node for a communication system comprising the first node and a second node. In a second communication procedure, the second node derives a fourth cryptosynchronization value (e.g., CryptoSync(IR)) and a fifth cryptosynchronization value (e.g., CryptoSyncShort(IR)) based on second node system time (e.g., SystemTime(IR)). The second node generates an initiator message digest based on the fourth cryptosynchronization value. The second node transmits the initiator message digest and the fifth cryptosynchronization value to the first node. The first node generates a sixth cryptosynchronization value (e.g., CryptoSync(RR)) based on (i) the fifth cryptosynchronization value received from the second node, (ii) first node system time (e.g., SystemTime(RR)), and (iii) and a cryptosynchronization adjustment value (e.g., x). The first node generates a responder message digest based on the sixth cryptosynchronization value. The first node compares (i) the initiator message digest received from the second node and (ii) the responder message digest to determine whether the second communication procedure fails.

BRIEF DESCRIPTION OF THE DRAWINGS

Other aspects, features, and advantages of the invention will become more fully apparent from the following detailed description, the appended claims, and the accompanying drawings in which like reference numerals identify similar or identical elements.

FIG. 6 is a flowchart of authentication procedure 600 according to one embodiment of the present invention wherein the cryptosync adjustment is performed by the processor (e.g., 402 of FIG. 4 or 502 of FIG. 5) on the initiator.

FIG. 7 is a flowchart of authentication procedure 700 according to one embodiment of the present invention wherein the cryptosync adjustment is performed by processor on the responder.

DETAILED DESCRIPTION

Certain embodiments of the present invention are methods for calculating either or both of Cryptosync(IR) and Cryptosync(RR) such that the cryptosync constraints of the communication system are satisfied, e.g., in a CDMA2000/EVDO system, Cryptosync(IR) will be (i) no greater (later) than SystemTime(RR) at the moment Cryptosync(RR) is calculated and (ii) less than SystemTime(RR) at the moment Cryptosync(RR) is calculated by no more than 16,535, regardless of differences between the system times of initiator and responder. Hence, using these methods, DH key-exchange and access-channel authentication procedures will succeed as long as the differences between the system times of initiator and responder is less than a pre-set time adjustment described below.

In one embodiment of the present invention, the initiator adds or subtracts a cryptosynchronization adjustment value x to/from SystemTime(IR) to compute a Cryptosync(IR) value that satisfies the cryptosync constraints. In another embodiment of the present invention, the responder adds or subtracts a cryptosynchronization adjustment value x to/from SystemTime(RR) so as to yield a value for Cryptosync(RR) that satisfies the cryptosync constraints. In yet another embodiment, both initiator and responder adjust their respective system times so as to yield values for Cryptosync(IR) and CryptoSync(RR) that satisfy the cryptosync constraints.

Figure 1:
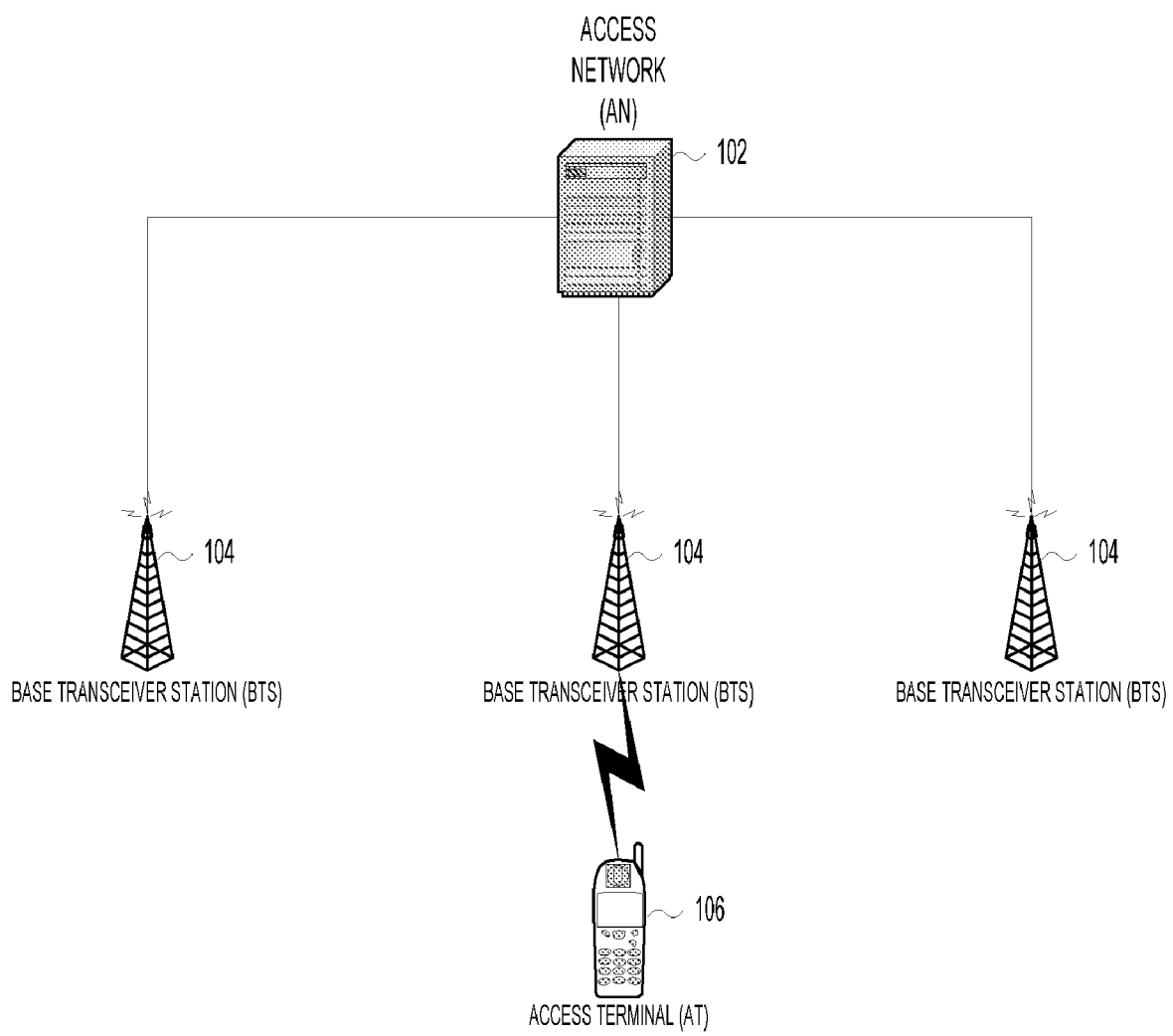
FIG. 1 is a block diagram of a portion of a typical CDMA network 100.
Figure 2:
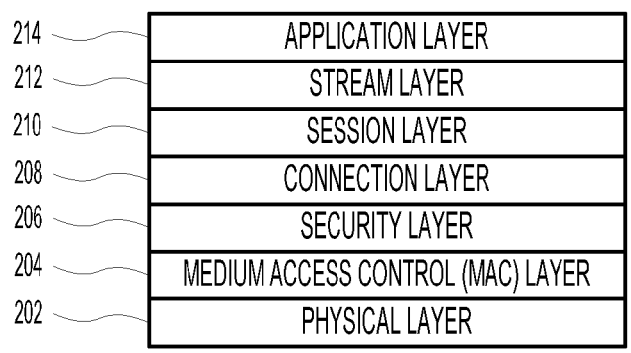
FIG. 2 is a diagram of the seven-layer model 200 used in CDMA2000.
Figure 4:
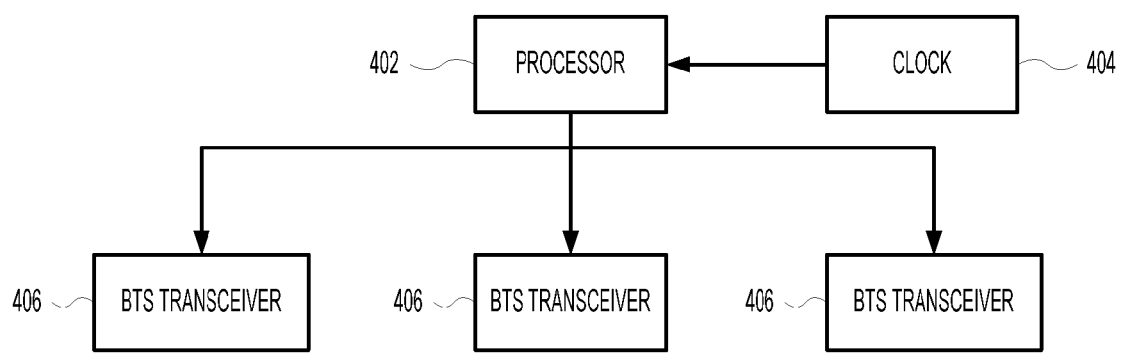
FIG. 4 is a block diagram of an implementation of access network 102 of FIG. 1 according to one embodiment of the present invention.

FIG. 4 is a block diagram of an implementation of access network 102 of FIG. 1 according to one embodiment of the present invention. Access network 102 comprises processor 402, clock 404, and one or more BTS transceivers 406. Access network 192 uses BTS transceivers 406 to communicate with one or more base-station transceivers (e.g., 104 of FIG. 1). Clock 404 generates the access network system time.

Figure 5:
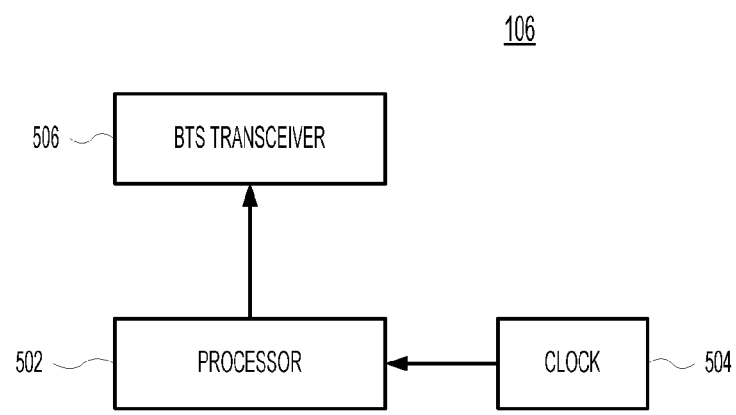
FIG. 5 is a block diagram of an implementation of access terminal 106 of FIG. 1 according to one embodiment of the present invention.

FIG. 5 is a block diagram of an implementation of access terminal 106 of FIG. 1 according to one embodiment of the present invention. Access terminal 106 comprises processor 502, clock 504 and BTS transceiver 506. Access terminal 106 communicates with one or more base-station transceivers (e.g., 104 of FIG. 1) using BTS transceiver 506. Clock 504 generates the access terminal system time.

Figure 3:
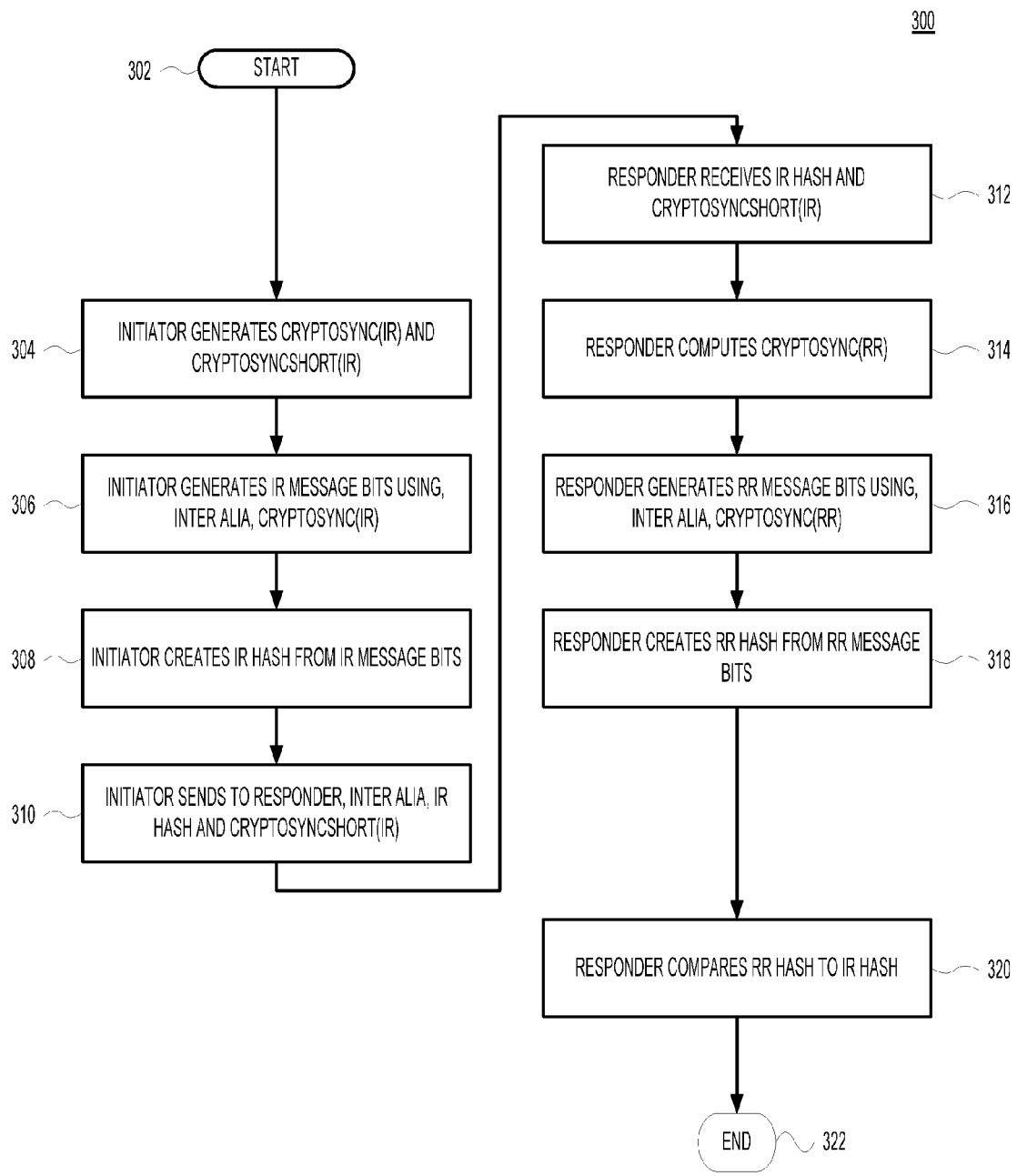
FIG. 3 is a flowchart of conventional access-channel authentication procedure 300.

FIG. 6 is a flowchart of authentication procedure 600 according to one embodiment of the present invention wherein the cryptosync adjustment is performed by the processor (e.g., 402 of FIG. 4 or 502 of FIG. 5) on the initiator. In FIG. 6, steps 602, 606, 608, 610, 612, 614, 616, 618, 620, and 622 are analogous to steps 302, 306, 308, 310, 312, 314, 316, 318, 320, and 322 of FIG. 3, respectively. Step 604, however, differs from step 304 in that CryptoSync(IR) is adjusted by the initiator so as to satisfy the cryptosync constraints.

If procedure 600 is the SHA-1 authentication procedure, then the access terminal is the initiator, and it is the generic security protocol which typically calculates CryptoSync(IR). Thus, the processor on the access terminal (e.g., 502 of FIG. 5) might execute a modified version of the generic security protocol that adjusts CryptoSync(IR). For example, Equation (1) used by the generic security protocol could be modified to yield the following Equation (4):

$$\text{Cryptosync(IR)} = \text{SystemTime(IR)} - x \quad (4)$$

where x is a cryptosynchronization adjustment value. Alternatively, the SHA-1 authentication procedure itself might be modified to adjust the CryptoSync(IR) and/or CryptosyncShort(IR) values after receiving those values from the generic security protocol.

FIG. 7 is a flowchart of authentication procedure 700 according to one embodiment of the present invention wherein the cryptosync adjustment is performed by processor on the responder. In FIG. 7, steps 702, 704, 706, 708, 710, 712, 716, 718, 720, and 722 are analogous to steps 302, 304, 306, 308, 310, 312, 316, 318, 320, and 322 of FIG. 3, respectively. Step 714, however, differs from step 314 in that CryptoSync(RR) is adjusted by the responder so as to satisfy the cryptosync constraints.

Thus, for example, if procedure 700 is part of the DH key-exchange protocol, then the access terminal is the responder, and it is the DH key-exchange protocol itself which calculates CryptoSync(RR) and CryptosyncShort (RR). Thus, the DH key-exchange protocol might be modified to adjust CryptoSync(RR). For example, Equation (3) used by the DH key-exchange protocol could be modified to yield the following Equation (5):

$$Cryptosync(RR) = \begin{pmatrix} SystemTime(RR) - x - \\ (((SystemTime(RR) - x)[15:0] - CryptosyncShort(IR)) \bmod 2^{16}) \end{pmatrix} \bmod 2^{64} \quad (5)$$

where x is a cryptosynchronization adjustment value.

The cryptosynchronization adjustment value x for a given network is set by the operator of the network so as to satisfy the cryptosync constraints of the network. Typically, the network operator will select a value for x that is greater than the expected maximum difference between the BTS/access terminal that does not have accurate timing and the access network system time.

Thus, for example, assume a network wherein the access-terminal cryptosync values for a particular exchange and the access-network time cryptosync values for the same exchange differ from each other by up to 1 second. The 1-second discrepancy is not a problem if Cryptosync(IR) is 1 second less (earlier) than the Cryptosync(RR); the Cryptosync(IR) can be up to 1.45 hours less (earlier) than Cryptosync(RR) and the procedure will still succeed. However, if Cryptosync(IR) is greater (later) than Cryptosync(RR) by any amount, the procedure will fail. Thus, at the very least, the operator of the network will set x to 1 second.

Assuming the access network is performing the adjustment, and that the access network is the responder (e.g., during the SHA-1 authentication procedure), the access network will add the cryptosynchronization adjustment value x to its SystemTime(RR) values when computing Cryptosync (RR). Thus, at one extreme, if Cryptosync(IR) is 20 ahead of SystemTime(RR), adding 1 second to SystemTime(RR) will result in SystemTime(RR) being equal to Cryptosync(IR). At the other extreme, if Cryptosync(IR) is 1 second behind SystemTime(RR), adding 1 second to SystemTime(RR) will result in SystemTime(RR) being 40 seconds greater (later) than Cryptosync(IR), well within the 1.45 hour limit.

Conversely, if the access network is the initiator (e.g., during the DH key-exchange procedure), the access network will subtract cryptosynchronization adjustment value x from its SystemTime(IR) values when computing Cryptosync(IR).

One advantage of these embodiments of the present invention is that they require minimal changes to the security-layer protocols. Furthermore, embodiments of the present invention can be implemented by updating only a subset of the devices in a network. In a typical CDMA2000/EVDO system, e.g., system 100 of FIG. 1, where a single access network might communicate with thousands of access terminals, it makes practical sense to implement embodiments of the present invention on the access network. Specifically, in those operations where the access network is the initiator, the access network will execute process 600 of FIG. 6. In those operations where the access network is the responder, the access network will execute process 700 of FIG. 7. As a result, no modifications will be required for the access terminals, which can execute prior-art, unmodified CDMA2000/EVDO processes.

Although embodiments of the present invention have been described in the context of EVDO/CDMA2000 systems, the present invention is not so limited. Embodiments of the present invention can be envisioned for any process where the success of a process requires that two calculated time values be within a certain range of each other.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

I claim:

1. A first node for a communication system comprising the first node and a second node, wherein, in a first communication procedure:
the first node derives (i) a first cryptosynchronization value (e.g., TimeStampLong(IR)) and (ii) a second cryptosynchronization value (e.g., TimeStampShort(IR)) based on (i) first node system time (e.g., SystemTime(IR)) and (ii) a cryptosynchronization adjustment value (e.g., x), wherein the cryptosynchronization adjustment value is selected to be greater than an expected maximum difference between the first node system time and the second node system time;
the first node generates an initiator message digest based on the first cryptosynchronization value;
the first node transmits the initiator message digest and the second cryptosynchronization value to the second node;
the second node generates a third cryptosynchronization value (e.g., TimeStampLong(RR)) based on (i) the second cryptosynchronization value received from the first node and (ii) second node system time (e.g., SystemTime(RR));
the second node generates a responder message digest based on the third cryptosynchronization value; and
the second node compares (i) the initiator message digest received from the first node and (ii) the responder message digest to determine whether the first communication procedure fails.

2. The invention of claim 1, wherein the first node is an access network and the second node is an access terminal.

3. The invention of claim 2, wherein the access network is adapted to communicate simultaneously with a plurality of access terminals, wherein, for each access terminal of the plurality, the access network performs the first communication procedure.

4. The invention of claim 1, wherein the first node is an access terminal and the second node is an access network.

5. The invention of claim 1, wherein the first communication procedure is part of a Diffie-Hellman key-exchange procedure.

6. The invention of claim 1, wherein, in the first communication procedure:
the first node derives the first cryptosynchronization value TimeStampLong(IR) according to:

$$\text{TimeStampLong(IR)} = \text{SystemTime(IR)} - x$$

where SystemTime(IR) is the first node system time and x is the cryptosynchronization adjustment value; and the first node derives the second cryptosynchronization value TimeStampShort(IR) according to:

TimeStampShort(IR)=TimeStampLong(IR)[15:0], where TimeStampLong(IR)[15:0] are the 16 least significant bits of TimeStampLong(IR).

7. The invention of claim 1, wherein the cryptosynchronization adjustment value is selected to ensure that specified cryptosynchronization constraints of the communication system are satisfied.

8. A first node for a communication system comprising the first and a second node, wherein, in a second communication procedure:
    the second node derives a fourth cryptosynchronization value (e.g., CryptoSync(IR)) and a fifth cryptosynchronization value (e.g., CryptoSyncShort(IR)) based on second node system time (e.g., SystemTime(IR));
    the second node generates an initiator message digest based on the fourth cryptosynchronization value;
    the second node transmits the initiator message digest and the fifth cryptosynchronization value to the first node;
    the first node generates a sixth cryptosynchronization value (e.g., CryptoSync(RR)) based on (i) the fifth cryptosynchronization value received from the second node, (ii) first node system time (e.g., SystemTime(RR)), and (iii) and a cryptosynchronization adjustment value (e.g., x), wherein the cryptosynchronization adjustment value is selected to be greater than an expected maximum difference between the access network system time and the access terminal system time;
    the first node generates a responder message digest based on the sixth cryptosynchronization value; and
    the first node compares (i) the initiator message digest received from the second node and (ii) the responder message digest to determine whether the second communication procedure fails.

9. The invention of claim 8, wherein the first node is an access network and the second node is an access terminal.

10. The invention of claim 9, wherein the access network is adapted to communicate simultaneously with a plurality of access terminals, wherein, for each access terminal of the plurality, the access network performs the second communication procedure.

11. The invention of claim 8, wherein the first node is an access terminal and the second node is an access network.

12. The invention of claim 8, wherein the second communication procedure is an SHA-1 authentication procedure.

13. The invention of claim 8, wherein, in the second communication procedure, the first node derives the sixth cryptosynchronization value Cryptosync(RR) according to:

$$Cryptosync(RR) = \left( \begin{array}{c} SystemTime(RR) - x - \\ (((SystemTime(RR) - x)[15:0] - CryptosyncShort(IR)) \bmod 2^{16}) \end{array} \right) \bmod 2^{64}$$

where SystemTime(RR) is the first node system time; x is the cryptosynchronization adjustment value; and CryptoSyncShort(IR) is the fifth cryptosynchronization value.

14. The invention of claim 8, wherein the cryptosynchronization adjustment value is selected to ensure that specified cryptosynchronization constraints of the communication system are satisfied.

15. The invention of claim 8, wherein the first node is further adapted to perform the first communication procedure of claim 1.

16. A communication system comprising the first node and the second node of claim 1.

17. A communication system comprising the first node and the second node of claim 8.

18. A first node for a communication system comprising the first and a second node, wherein, in a second communication procedure:
    the second node derives a fourth cryptosynchronization value (e.g., CryptoSync(IR)) and a fifth cryptosynchronization value (e.g., CryptoSyncShort(IR)) based on second node system time (e.g., SystemTime(IR));
    the second node generates an initiator message digest based on the fourth cryptosynchronization value;
    the second node transmits the initiator message digest and the fifth cryptosynchronization value to the first node;
    the first node generates a sixth cryptosynchronization value (e.g., CryptoSync(RR)) based on (i) the fifth cryptosynchronization value received from the second node, (ii) first node system time (e.g., SystemTime(RR)), and (iii) and a cryptosynchronization adjustment value (e.g., x);
    the first node generates a responder message digest based on the sixth cryptosynchronization value;
    the first node compares (i) the initiator message digest received from the second node and (ii) the responder message digest to determine whether the second communication procedure fails; and
    the first node derives the sixth cryptosynchronization value Cryptosync(RR) according to:

$$Cryptosync(RR) = \left( \begin{array}{c} SystemTime(RR) - x - \\ (((SystemTime(RR) - x)[15:0] - CryptosyncShort(IR)) \bmod 2^{16}) \end{array} \right) \bmod 2^{64}$$

where SystemTime(RR) is the first node system time; x is the cryptosynchronization adjustment value; and CryptoSyncShort(IR) is the fifth cryptosynchronization value.

* * * * *